United States Patent
Liang

(10) Patent No.: US 9,855,992 B1
(45) Date of Patent: Jan. 2, 2018

(54) HUB MOTOR

(71) Applicants: SAFEWAY ELECTRO-MECHANICAL CO., LTD., New Taipei (TW); Chia-Sheng Liang, Taipei (TW)

(72) Inventor: Chia-Sheng Liang, Taipei (TW)

(73) Assignees: SAFEWAY ELECTRO-MECHANICAL CO., LTD., New Taipei (TW); Chia-Sheng Liang, Taipei (TW)

( * ) Notice: Subject to any disclaimer, the term of this patent is extended or adjusted under 35 U.S.C. 154(b) by 0 days.

(21) Appl. No.: 15/238,927

(22) Filed: Aug. 17, 2016

(30) Foreign Application Priority Data

Jul. 1, 2016 (TW) .............................. 105120947 A

(51) Int. Cl.
| | | |
|---|---|---|
| *B62M 6/65* | (2010.01) | |
| *F16H 1/28* | (2006.01) | |
| *B60K 7/00* | (2006.01) | |
| *B62M 7/12* | (2006.01) | |

(52) U.S. Cl.
CPC ............ *B62M 6/65* (2013.01); *B60K 7/0007* (2013.01); *B62M 7/12* (2013.01); *F16H 1/28* (2013.01); *B60K 2007/0092* (2013.01)

(58) Field of Classification Search
CPC ......... B60K 7/0007; B60K 2007/0092; B62M 6/65; B62M 7/12; F16H 1/28
See application file for complete search history.

(56) References Cited

U.S. PATENT DOCUMENTS

| | | | |
|---|---|---|---|
| 3,812,928 A | 5/1974 | Rockwell et al. | |
| 6,286,616 B1 | 9/2001 | Kutter | |
| 6,580,188 B2 | 6/2003 | Katagiri et al. | |
| 7,357,743 B2 | 4/2008 | Mao et al. | |
| 7,472,770 B2 | 1/2009 | Tomoshige et al. | |
| 8,245,804 B2 | 8/2012 | van Rooij | |
| 2008/0202832 A1* | 8/2008 | Ai ........................ | B60K 7/0007 180/65.51 |
| 2008/0308336 A1* | 12/2008 | van Rooij ................ | B62M 6/65 180/206.6 |
| 2009/0000840 A1* | 1/2009 | Murata ................. | B60K 7/0007 180/65.51 |
| 2016/0263987 A1* | 9/2016 | Brownell ............. | B60K 17/046 |

FOREIGN PATENT DOCUMENTS

| | | |
|---|---|---|
| EP | 1137154 A1 | 9/2001 |
| TW | 501330 | 9/2002 |

* cited by examiner

*Primary Examiner* — Huan Le
(74) *Attorney, Agent, or Firm* — Chun-Ming Shih

(57) ABSTRACT

A gear motor for decreasing speed at a mechanical power output is provided with a housing; a supporting shaft through the housing; an electric motor in the housing and including a stator secured to the supporting shaft, and a rotor surrounding the stator and driven by the outer stator; a planetary gear train surrounding the rotor and including planet gear assemblies, a stationary ring gear at one end of the planet gear assemblies, and a driving ring gear at the other end of the planet gear assemblies. The driving ring gear rotates the housing either in one direction or in each of two opposite directions. The planet gear assemblies and the rotor form an annular rotor. Each planet gear assembly includes coaxial first and second planet gears. The first planet gear meshes the stationary ring gear. The second planet gear meshes the driving ring gear.

12 Claims, 9 Drawing Sheets

HUB MOTOR

BACKGROUND OF THE INVENTION

1. Technical Field

The invention relates to gear motors and more particularly to a hub motor.

2. Related Art

A gear motor is an electric motor having a reduction gear assembly or a non-gear type speed reduction mechanism. For achieving a low speed and high torque output, a motor is required to have an increased size and thus has an increased manufacturing cost. To the contrary, for achieving a high speed and low torque output, a motor is required to have a decreased size and thus has a decreased manufacturing cost. The reduction gear assembly can lower an input speed and increase output torque of a motor.

Conventionally, a hub motor is for a wheeled conveyance and is classified as either in runner or out runner. For a hub motor of in runner type, whether it is provided with a reduction gearing, the stator of the motor is secured to a base. Further, a rotor has a power output mechanism extending laterally, then radially, and finally attached to a wheel rim. This is a very complicated arrangement. Thus, hub motors of out runner type are preferred and they can be found in patent literature such as U.S. Pat. Nos. 6,286,616 and 6,580,188, and EPO Publication Number EP1137154 which all are directed to electric bicycles having a hub motor as an auxiliary power source for saving labor when pedaling. However, the electric bicycles having a hub motor of above patent literature are bulky, have a heavy inertia, and are difficult of being maneuvered due to no provision of reduction gearing. Also, the manufacturing cost of the hub motor is very high.

U.S. Pat. Nos. 3,812,928, 7,357,743 and 7,472,770, and Taiwan Invention Patent Publication Number 501330 are all directed to hub motors of out runner type having a lateral reduction gearing. While they have decreased radial size, its axial size increases greatly. Thus, they are not appropriate for bicycles or motorcycles having a hub motor with a limited axial length.

U.S. Pat. No. 8,245,804 discloses a hub motor of out runner type characterized in that a sun gear is on one end of a stator, an annular gear is on the other end of the stator and secured to a hub, an idler gear is provided on the base of the stator and meshes the sun gear and the annular gear respectively, a rotor is capable of transmitting power output to the sun gear, the power output is in turn transmitted to the annular gear via the idler gear, and finally, the power output is transmitted to the hub. While it has a much decreased axial length, a thrust bearing is required to install at one end of the rotor. However, high precision is required in the manufacturing for installing the thrust bearing. Further, the manufacturing cost of the large thrust bearing is very high and the installation of the large bearing is very difficult. A difference between the number of the teeth of the annular gear and that of the teeth of the sun gear is small, resulting in a limited speed reduction at a power output of the hub motor.

Notwithstanding the prior art, the invention is neither taught nor rendered obvious thereby.

BRIEF SUMMARY

It is therefore an object of the invention to provide a gear motor comprising a hub motor comprising a housing as a power output; a supporting shaft disposed through the housing; an electric motor in the housing and including a stator secured to the supporting shaft, and a rotor surrounding the stator and driven by the stator; a planetary gear train surrounding the rotor and including a plurality of planet gear assemblies, a stationary ring gear at one end of the planet gear assemblies, and a driving ring gear at the other end of the planet gear assemblies; wherein the driving ring gear is configured to rotate the housing either in one direction or in each of two opposite directions, the planet gear assemblies and the rotor form an annular rotor, the planet gear assemblies are equally spaced apart around the rotor, each planet gear assembly includes a first planet gear and a second planet gear coaxial with and co-rotated with the first planet gear, the first planet gear meshes the stationary ring gear, the second planet gear meshes the driving ring gear, the number of the teeth of the first planet gear is equal to that of the teeth of the second planet gear, the number of the teeth of the stationary ring gear is different from that of the teeth of the driving ring gear, and a difference between the number of the teeth of the stationary ring gear and that of the teeth of the driving ring gear is a multiple of the number of the planet gear assemblies.

Preferably, further comprises two support plates disposed at two ends of the planet gear assemblies respectively to position the planet gear assemblies.

Preferably, a difference between the number of the teeth of the stationary ring gear and the number of the teeth of the driving ring gear is equal to the number of the planet gear assemblies.

Preferably, the modulus of the first planet gear is different from the modulus of the second planet gear, the modulus of the stationary ring gear is equal to that of the first planet gear, and the modulus of the driving ring gear is equal to that of the second planet gear.

Preferably, further comprises a disc formed on one end of the stationary ring gear, and a splined hole formed through a center of the disc, and the supporting shaft includes an externally splined section meshing the splined hole.

Preferably, the support plates are disposed at two ends of the planet gear assemblies respectively and the rotor are configured to position the first and second planet gears of each planet gear assembly so that the support plates are configured to rotate about the supporting shaft in response to rotating the rotor.

Preferably, further comprises a plurality of axles each disposed through the first and second planet gears of each planet gear assembly, and two ends of each axle engage the support plates respectively.

Preferably, each support plate includes a central hole, further comprises two bearings mounted between the central hole and the supporting shaft so that the annular rotor is configured to rotate about the supporting shaft.

Preferably, the driving ring gear is secured to the housing, and the housing is configured to rotate clockwise or counterclockwise in response to a clockwise or counterclockwise rotation of the driving ring gear.

Preferably, the driving ring gear is secured to the housing via a ratchet assembly, and the housing is configured to rotate counterclockwise only in response to a counterclockwise rotation of the driving ring gear.

Preferably, the electric motor is an out runner brushless direct current motor.

The invention has the following advantages:

Two ring gears are taken as a replacement of the sun gear in the conventional planetary gear train. The two ring gears of the planetary gear train are disposed at two ends of the motor respectively. A high speed reduction ratio of the hub motor can be expressed below. The number of the teeth of the driving ring gear is divided by a number which is obtained by taking the number of the teeth of the stationary ring gear away from the number of the teeth of the driving ring gear. Space of the hub motor is greatly decreased. The number of components is decreased to simplify the construction.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
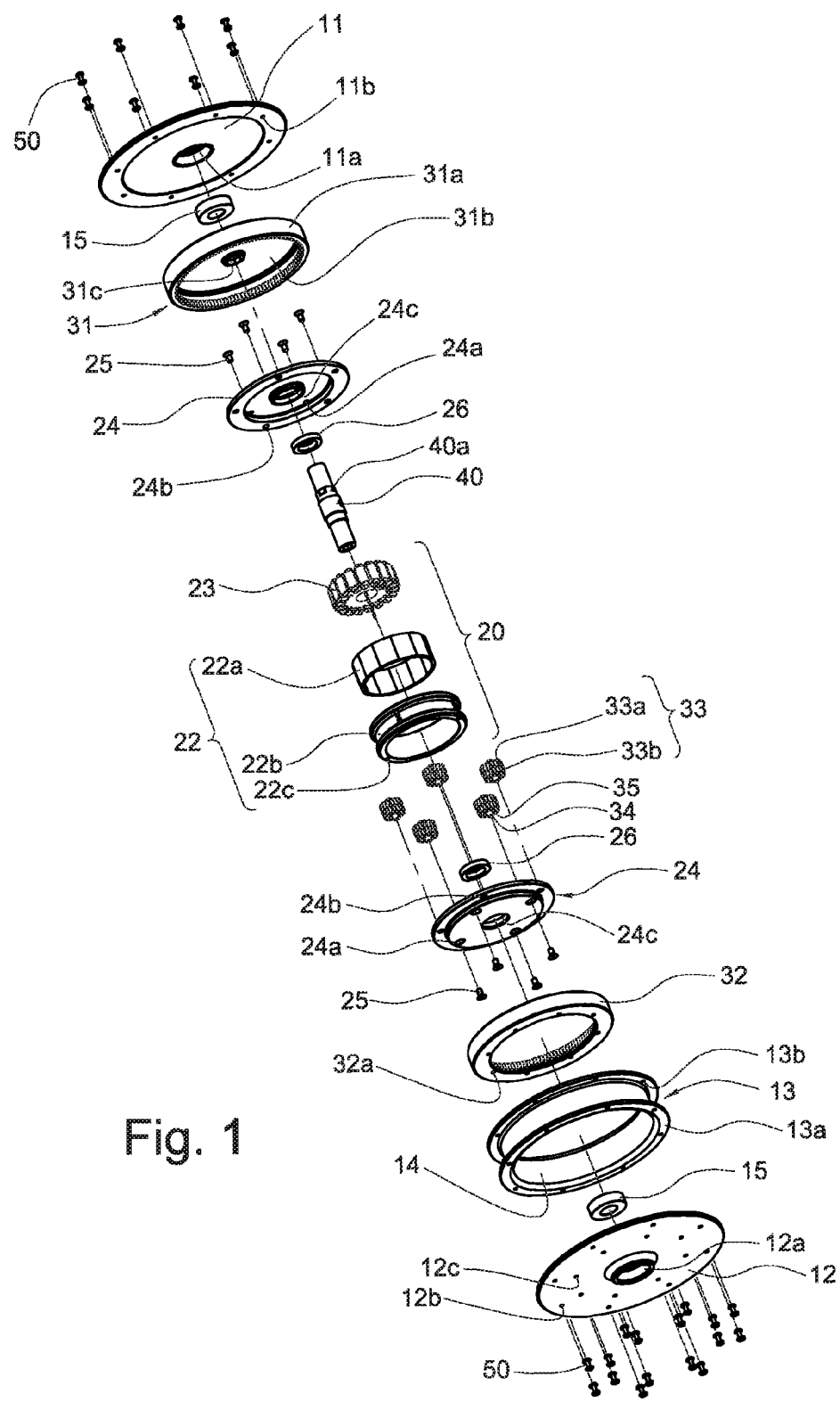
FIG. 1 is an exploded view of a hub motor according to a first preferred embodiment of the invention.
Figure 2:
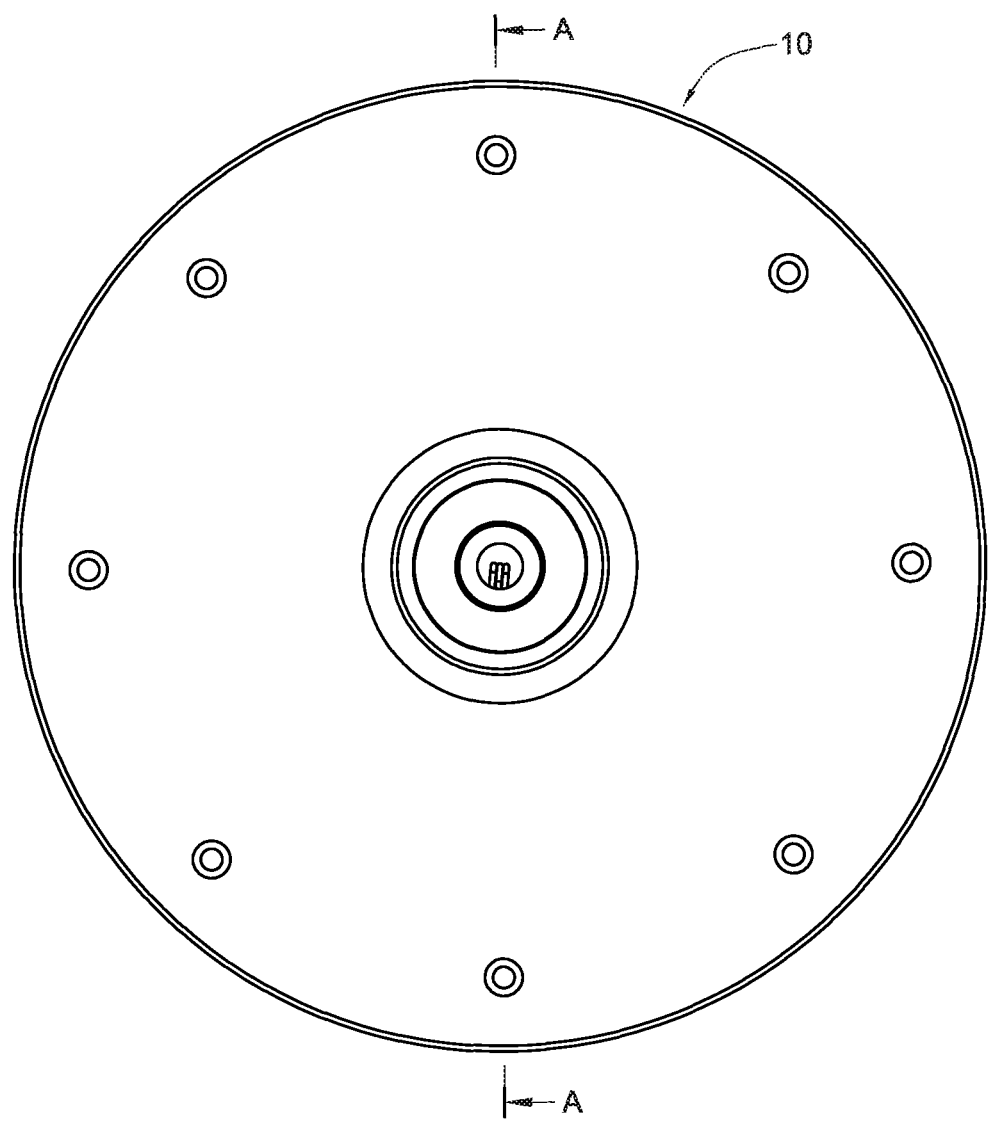
FIG. 2 is an end view of the assembled hub motor.
Figure 3:
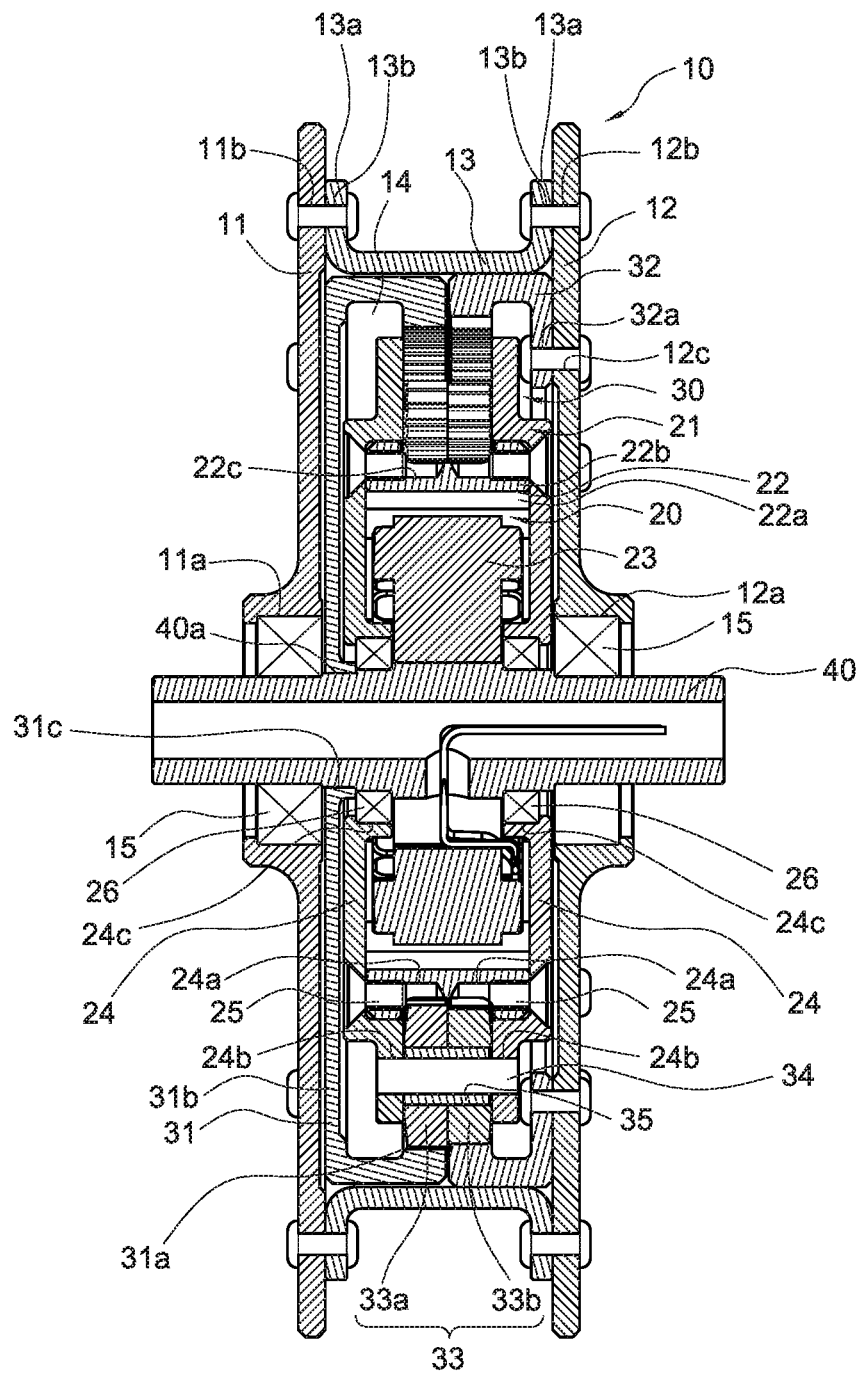
FIG. 3 is a sectional view taken along line A-A of FIG. 2.

Referring to FIGS. 1 to 3, a hub motor in accordance with a first preferred embodiment of the invention comprises a housing 10, an electric motor 20, a planetary gear train 30 and a supporting shaft 40 as discussed in detail below.

The supporting shaft 40 is secured to a frame of an external device (not shown) and taken a fastened end of the hub motor. The housing 10 includes a first shell 11, a second shell 12, a groove ring 13 fastened between the first shell 11 and the second shell 12 by means of rivets, and a space 14 defined in the housing 10. The space 14 is for housing both the electric motor 20 and the planetary gear train 30. A plurality of rivet holes 11b are provided along the annular edge of the first shell 11. A plurality of rivet holes 12b are provided along the annular edge of the second shell 12. The grooved ring 13 includes two opposite flanges 13a each having a plurality of rivet holes 13b. A plurality of rivets 50 are driven through the rivet holes 11b, 13b and 12b to fasten the first shell 11, the grooved ring 13, and the second shell 12 together. The first shell 11 includes a central opening 11a and the second shell 12 includes a central opening 12a respectively. Two bearings 15 are provided in which one bearing 15 is mounted between the central opening 11a and the supporting shaft 40 and the other bearing 15 is mounted between the central opening 12a and the supporting shaft 40. As a result, the housing 10 is assembled.

The electric motor 20 is an out runner brushless direct current motor and the power source of the hub motor. The electric motor 20 includes a stator 23 secured to the supporting shaft 40, and a rotor 22 surrounding the stator 23 and fastened between two opposite support plates 24 which are put on the supporting shaft 40. The rotor 22 includes a ring shaped permanent magnet 22a having a north (N) magnetic pole and a south (S) magnetic pole, and a ring-shaped magnetic seat 22b attached to the permanent magnet 22a.

The stator 23 has a plurality of magnetic metal plates and windings (not shown). The stator 23 is powered by a power supply which is controlled by a controller. According to Ampere's law, current through a wire (e.g., windings of the stator 23) produces a magnetic field. Further, the magnetic field interacts with the magnetic field of the permanent magnet 22a to rotate the rotor 22, i.e., the motor 20 being rotated.

A plurality of threaded holes 22c are provided in the magnetic seat 22b. A plurality of through holes 24a are provided through annular edge of each support plate 24. A plurality of screws 25 are driven through the through holes 24a into the threaded holes 22c to fasten the magnetic seat 22b and the support plates 24 together.

As shown in FIGS. 1 and 3, the planetary gear train 30 includes a stationary ring gear 31a, a driving ring gear 32, and a plurality of planet gear assemblies 33. Alternatively, only one planet gear assembly 33 is provided in other embodiments.

A plurality of rivet holes 32a are provided along the annular edge of the driving ring gear 32. A plurality of rivet holes 12c are provided along the annular edge of the second shell 12. A plurality of rivets 50 are driven through the rivet holes 12c and 32a to fasten the driving ring gear 32 and the second shell 12 together. The housing 10 may rotate as the driving ring gear 32 rotates. An integral stationary ring gear unit 31 includes the stationary ring gear 31a, a disc 31b formed on one end of the stationary ring gear 31a, and a splined hole 31c formed through a center of the disc 31b. The supporting shaft 40 has an externally splined section 40a meshing the splined hole 31c after inserting the supporting shaft 40 through the splined hole 31c. Thus, the stationary ring gear unit 31 and the supporting shaft 40 are secured together.

The number of the planet gear assemblies 33 is five and the planet gear assemblies 33 are equally spaced apart in both the driving ring gear 32 and the stationary ring gear 31a. The support plates 24 are provided at two ends of the planet gear assemblies 33 respectively so as to position the planet gear assemblies 33.

Each planet gear assembly 33 includes a first planet gear 33a and a coaxial second planet gear 33b. Each of a plurality of axles 34 is provided through a center of the planet gear assembly 33. A bearing 35 is provided between the axle 34 and the planet gear assembly 33. A plurality of holes 24b are formed and equally spaced apart along a periphery of the support plate 24. The number of the holes 24b is equal to that of the planet gear assembly 33. Two ends of the axle 34 are disposed in the aligned holes 24b of the two support plates 24 respectively.

Figure 4:
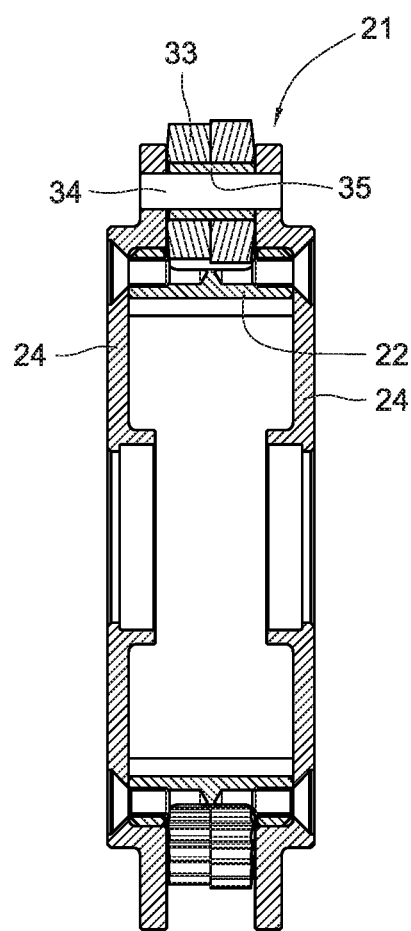
FIG. 4 is a longitudinal sectional view of the annular rotor.

As shown in FIG. 4, after driving the screws 25 through the through holes 24a into the threaded holes 22c to fasten the magnetic seat 22b and the support plates 24 together, the planet gear assemblies 33 are positioned between the support plates 24 and the support plates 24 are spaced apart by the magnetic seat 22b. Thus, each planet gear assembly 33 is allowed to rotate on the axle 34. The rotor 22, the planet gear assemblies 33, the axles 34, and the bearings 35 form an annular rotor 21 between the support plates 24. A central hole 24c is formed through the support plate 24. Each of two bearings 26 is mounted between the hole 24c and the supporting shaft 40. Thus, the annular rotor 21 may rotate about the supporting shaft 40. Further, each planet gear assembly 33 may rotate about the supporting shaft 40.

Referring back to FIG. 3, the first planet gear 33a meshes the stationary ring gear 31a and the second planet gear 33b meshes the driving ring gear 32 respectively. The first planet gear 33a may rotate as the annular rotor 21 rotates. The second planet gear 33b driven by the first planet gear 33a may rotate the driving ring gear 32. The driving ring gear 32 thus rotates in low speed.

A conventional planetary gear train includes a carrier, a sun gear, a plurality of planet gears supported by the carrier, and an annular gear. The planetary gear train 30 of the invention includes the two ring gears 32 and 31a as a replacement of the sun gear. The conventional planetary gear train only extends toward one end of the hub motor. To the contrary, the ring gears 32 and 31a of the planetary gear train 30 of the invention are disposed at two ends of the motor 20 respectively. As a result, space occupied by the hub motor of the invention is greatly decreased.

The number of the teeth of the stationary ring gear 31a is different from that of the teeth of the driving ring gear 32. In detail, the number of the teeth of the stationary ring gear 31a is an integer A, the number of the teeth of the driving ring gear 32 is an integer B, and A is not equal to B. Further, the modulus of the first planet gear 33a is different from the modulus of the second planet gear 33b. In detail, the modulus of the first planet gear 33a is X, the modulus of the second planet gear 33b is Y, and X is not equal to Y. The modulus of the stationary ring gear 31a is X because the stationary ring gear 31a meshes the first planet gear 33a. Similarly, the modulus of the driving ring gear 32 is Y because the driving ring gear 32 meshes the second planet gear 33b.

According to Ampere's law, current through a wire (e.g., windings of the stator 23) produces a magnetic field. Further, the magnetic field interacts with the magnetic field of the permanent magnet 22a to rotate the rotor 22. The rotor 22 in turn rotates the annular rotor 21. Further, the planet gear assemblies 33 rotate about the supporting shaft 40. The first planet gears 33a, having the modulus X and meshing the stationary ring gear 31a, rotate. The first and second planet gears 33a, 33b are arranged coaxially and co-rotated. In response to rotating the first planet gear 33a, the second planet gear 33b also rotates. That is, each of the first and second planet gears 33a, 33b turns and together they move around the supporting shaft 40. Taking the driving ring gear 32 as an output, the first planet gears 33a having the modulus X mesh the stationary ring gear 31a having the number of the teeth A, and the second planet gears 33b having the modulus Y mesh the driving ring gear 32 having the number of the teeth B. The stationary ring gear 31a is secured to the supporting shaft 40 and not rotatable. The driving ring gear 32, having the number of the teeth B which is different from the number of the teeth A of the stationary ring gear 31a, may rotate the driving ring gear 32 in a low speed. As a result, rotational speed of the load is decreased. Speed reduction ratio of the hub motor of the first preferred embodiment of invention can be expressed below.

The number of the teeth of the driving ring gear is divided by a number which is obtained by taking the number of the teeth of the stationary ring gear away from the number of the teeth of the driving ring gear.

Figure 5:
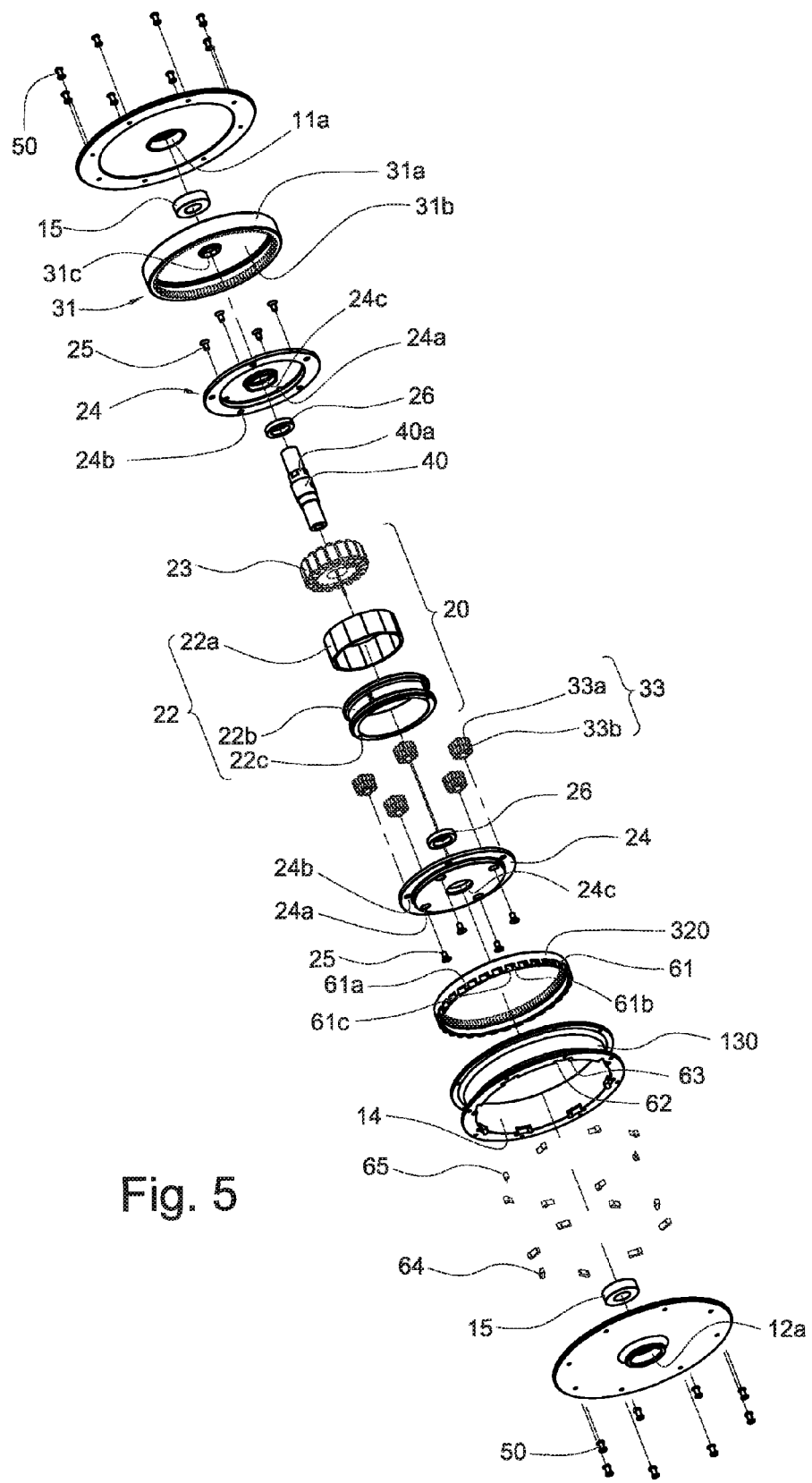
FIG. 5 is an exploded view of a hub motor according to a second preferred embodiment of the invention.
Figure 6:
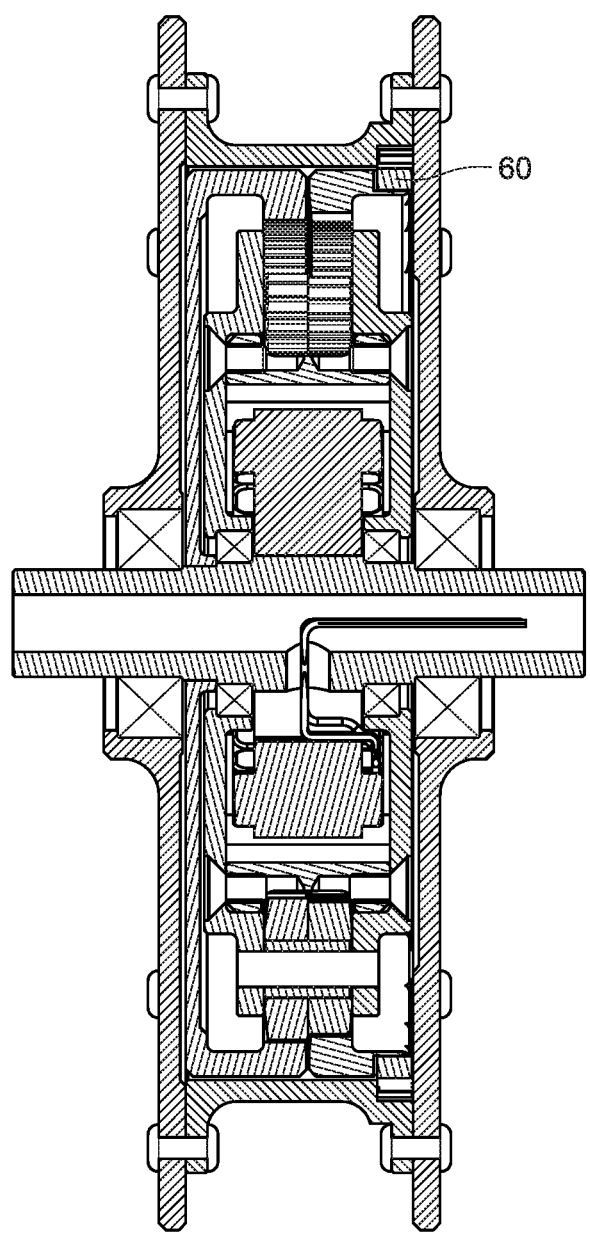
FIG. 6 is a longitudinal sectional view of the assembled hub motor of FIG. 5.
Figure 7:
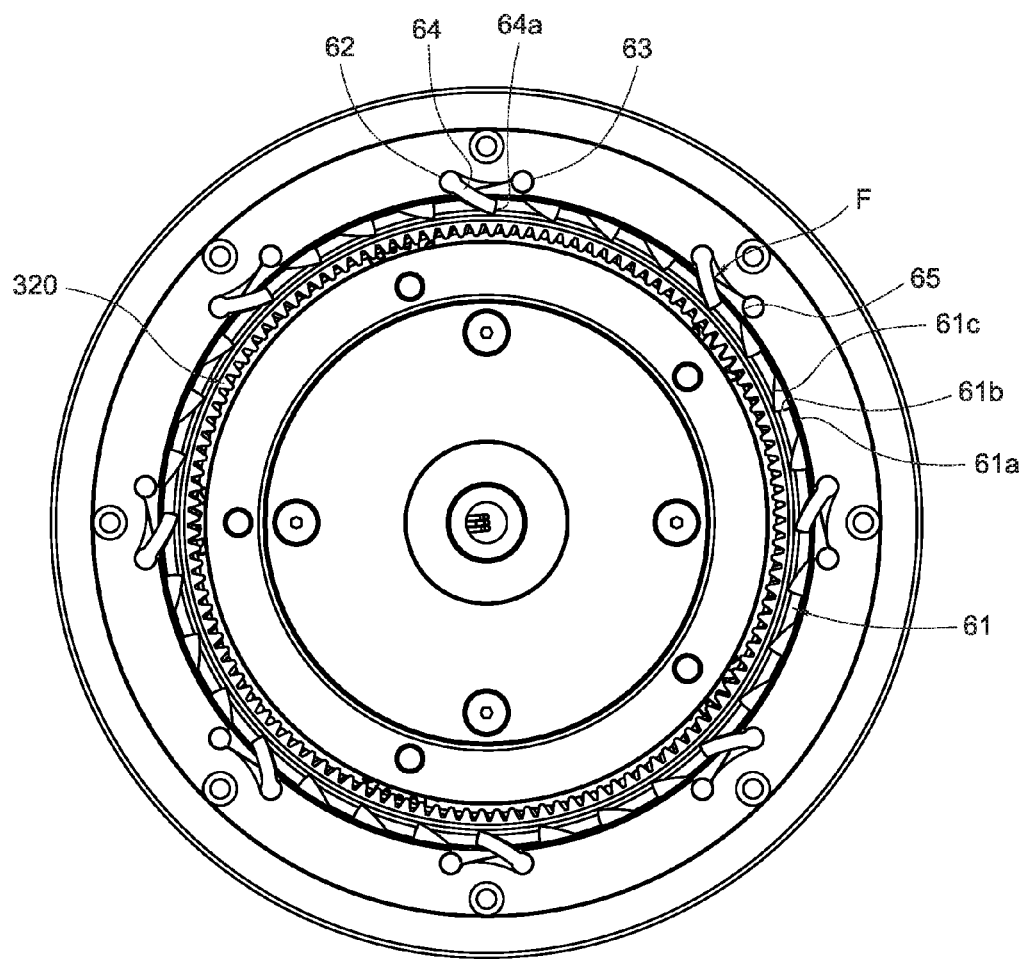
FIG. 7 is an end view of the ratchet assembly.

Referring to FIGS. 5 to 7, a hub motor in accordance with a second preferred embodiment of the invention is shown. The characteristics of the second preferred embodiment are substantially the same as that of the first preferred embodiment except the following:

A ratchet assembly 60 is provided and each ratchet includes a ratchet wheel 61 formed integrally with an outer surface of the driving ring gear 320. The ratchet wheel 61 includes a plurality of teeth 61a each having a steeply sloped edge 61b and a gently sloped edge 61c; a first pivot 62 secured to a grooved ring 130 of a housing 100; a second pivot 63 adjacent to the first pivot 62; a pawl 64 pivotably secured to the first pivot 62; and a spring 65 mounted on the second pivot 63 and attached to the pawl 64 so that the pawl 64 is pivotable. Therefore, the driving ring gear 320 may be operated in the housing 100 as detailed below.

Figure 8:
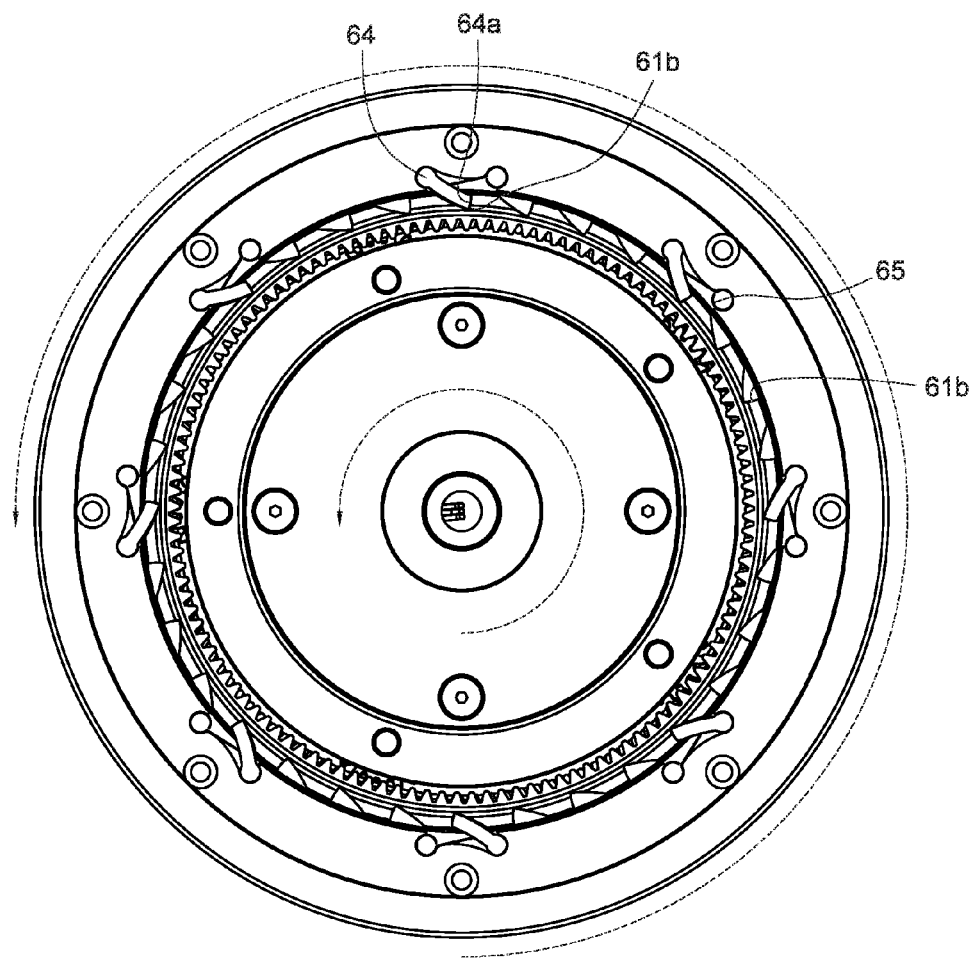
FIG. 8 is a view similar to FIG. 7 showing a counter-clockwise rotation of the ratchet assembly.

As shown in FIG. 8, the driving ring gear 320 rotates counterclockwise. And in turn, the pawl 64 pivots clockwise as the spring 65 expands, a tip 64a of the pawl 64 engages the steeply sloped edge 61b, the pawl 64 engages the teeth 61a, and the housing 100 rotates counterclockwise.

Figure 9:
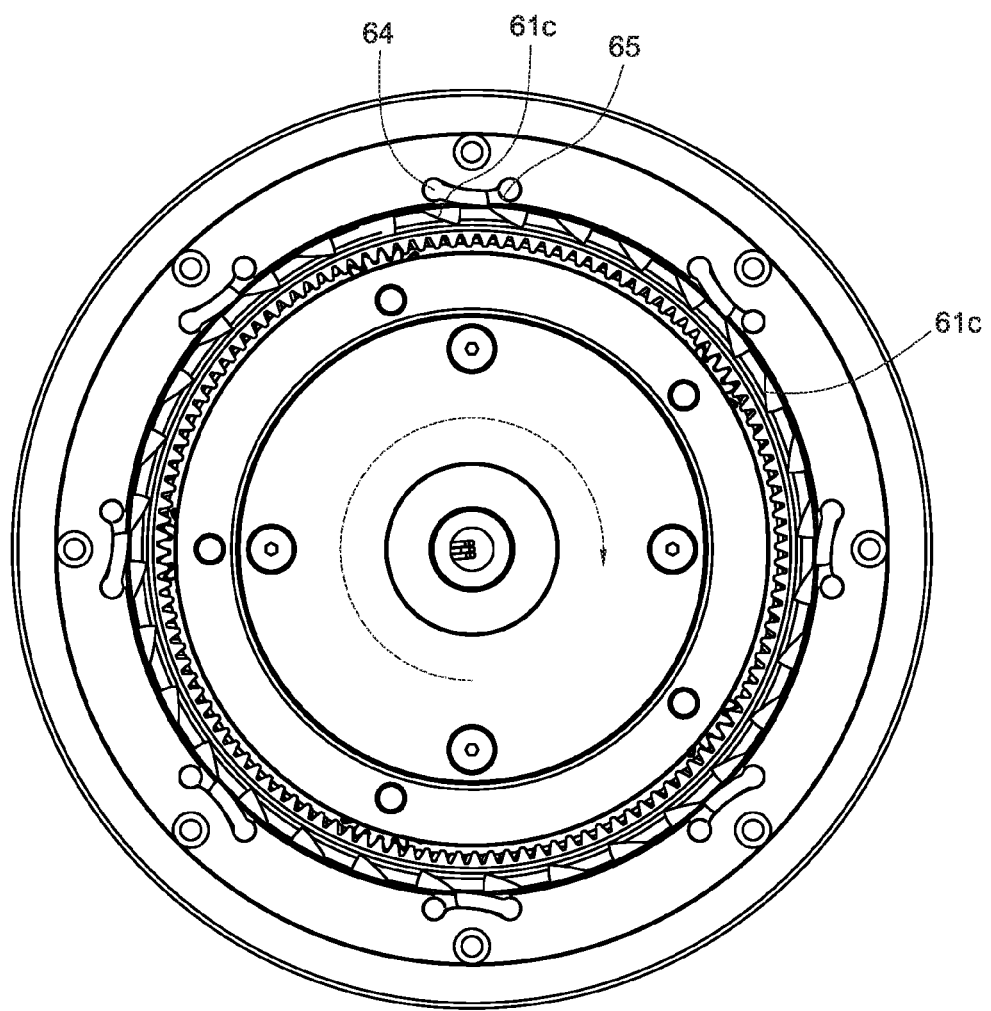
FIG. 9 is a view similar to FIG. 7 showing a clockwise rotation of the ratchet assembly.

As shown in FIG. 9, the driving ring gear 320 rotates clockwise. And in turn, the pawl 64 pivots counterclockwise to slide up and over the gently sloped edge 61c as the spring 65 compresses, the tip 64a of the pawl 64 disengages from the gear 61, and the housing 100 does not rotate.

According to Ampere's law, current through a wire (e.g., windings of the stator 23) produces a magnetic field. Further, the magnetic field interacts with the magnetic field of the permanent magnet 22a to rotate the rotor 22. The rotor 22 in turn rotates the annular rotor 21. Further, the planet gear assemblies 33 rotate about the supporting shaft 40. The first planet gears 33a, having the modulus X and meshing the stationary ring gear 31a, rotate. The first and second planet gears 33a, 33b are arranged coaxially and co-rotated. In response to rotating the first planet gear 33a, the second planet gear 33b also rotates. That is, each of the first and second planet gears 33a, 33b turns and together they move around the supporting shaft 40. Taking the driving ring gear 320 as an output, the first planet gears 33a having the modulus X mesh the stationary ring gear 31a having the number of the teeth A, and the second planet gears 33b having the modulus Y mesh the driving ring gear 320 having the number of the teeth B. The stationary ring gear 31a is secured to the supporting shaft 40 and not rotatable. The driving ring gear 320, having the number of the teeth B which is different from the number of the teeth A of the stationary ring gear 31a, may rotate the driving ring gear 320 in a low speed. As a result, rotational speed of the load is decreased. Speed reduction ratio of the hub motor of the second preferred embodiment of invention is the same as that of the hub motor of the first preferred embodiment of invention.

As discussed above, a clockwise rotation of the driving ring gear 320 cannot rotate the housing 100 because the tip 64a of the pawl 64 disengages from the ratchet wheel 61.

The characteristics of the invention are briefed below. Two ring gears are taken as a replacement of the sun gear in the conventional planetary gear train. The two ring gears of the planetary gear train are disposed at two ends of the motor respectively. A high speed reduction ratio of the hub motor can be expressed below. The number of the teeth of the driving ring gear is divided by a number which is obtained by taking the number of the teeth of the stationary ring gear away from the number of the teeth of the driving ring gear. Space of the hub motor is greatly decreased. The number of components is decreased to simplify the construction.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A hub motor comprising:
a housing as a power output;
a supporting shaft disposed through the housing;
an electric motor in the housing and the electric motor including a stator secured to the supporting shaft, and a rotor surrounding the stator and driven by the stator; and
a planetary gear train surrounding the rotor and including a plurality of planet gear assemblies, a stationary ring gear at one end of the planet gear assemblies, and a driving ring gear at another end of the planet gear assemblies;
wherein the driving ring gear is configured to rotate the housing, the planet gear assemblies and the rotor form an annular rotor, the planet gear assemblies are equally spaced apart around the rotor, each planet gear assembly includes a first planet gear and a second planet gear coaxial with and co-rotated with the first planet gear, the first planet gear meshes with the stationary ring gear, the second planet gear meshes with the driving ring gear, a number of teeth of the first planet gear is equal to that of teeth of the second planet gear, a number of teeth of the stationary ring gear is different from that of teeth of the driving ring gear, and a difference between the number of the teeth of the stationary ring gear and that of the teeth of the driving ring gear is a multiple of the number of the planet gear assemblies.

2. The hub motor of claim 1, further comprising two support plates each disposed at two ends of the planet gear assemblies respectively to position the planet gear assemblies.

3. The hub motor of claim 2, wherein the rotor is configured to position the first and second planet gears of each planet gear assembly so that the support plates are configured to rotate about the supporting shaft in response to rotating the rotor.

4. The hub motor of claim 3, further comprising a plurality of axles each disposed through the first and second planet gears of each planet gear assembly, and wherein two ends of each axle engage the support plates respectively.

5. The hub motor of claim 2, wherein each support plate includes a central hole, further comprising two bearings mounted between the central hole and the supporting shaft so that the annular rotor is configured to rotate about the supporting shaft.

6. The hub motor of claim 1, wherein a difference between the number of the teeth of the stationary ring gear and the number of the teeth of the driving ring gear is equal to the number of the planet gear assemblies.

7. The hub motor of claim 6, wherein a modulus of the first planet gear is different from that of the second planet gear, a modulus of the stationary ring gear is equal to that of the first planet gear, and a modulus of the driving ring gear is equal to that of the second planet gear.

8. The hub motor of claim 1, wherein a modulus of the first planet gear is different from that of the second planet gear, a modulus of the stationary ring gear is equal to that of the first planet gear, and a modulus of the driving ring gear is equal to that of the second planet gear.

9. The hub motor of claim 1, further comprising a disc formed on one end of the stationary ring gear, and a splined hole formed through a center of the disc, and wherein the supporting shaft includes an externally splined section meshing the splined hole.

10. The hub motor of claim 1, wherein the driving ring gear is secured to the housing, and the housing is configured to rotate clockwise or counterclockwise in response to a clockwise or counterclockwise rotation of the driving ring gear.

11. The hub motor of claim 1, wherein the driving ring gear is secured to the housing via a ratchet assembly, and the housing is configured to rotate counterclockwise only in response to a counterclockwise rotation of the driving ring gear.

12. The hub motor of claim 1, wherein the electric motor is an out runner brushless direct current motor.

* * * * *